Patented Apr. 18, 1939

2,154,444

UNITED STATES PATENT OFFICE 2,154,444

METHOD FOR IMPROVING AND PURIFYING PETROLEUM BYPRODUCTS

Frederick E. Frey and Paul A. Bury, Bartlesville, Okla., assignors to Phillips Petroleum Company, Bartlesville, Okla., a corporation of Delaware No Drawing. Application May 2, 1934, Serial No. 723,607

8 Claims. (Cl. 260—94)

This invention relates to methods of treating resinous reaction products of olefins and sulfur dioxide for effecting purification and improving the moldability by application of heat and pressure into coherent forms. Methods of molding sulfur dioxide-olefin polymers under heat and pressure into coherent bodies have been set forth in a copending application Ser. No. 599,350, filed March 16, 1932.

The object of this invention is severalfold:

1. To produce a molding compound which can be satisfactorily molded into coherent articles at temperatures and pressures in common use in the plastic molding industry.

2. To produce a molding material substantially free from sulfur dioxide or other compounds which would attack or discolor the tool steel commonly used for molds and dies.

3. To produce a molding compound which can be transformed by heat and pressure or equivalent methods into transparent or translucent articles free from gas bubbles, unreacted hydrocarbons, dirt or other foreign matter.

4. To produce a molding compound which will remain unchanged under ordinary conditions of transporting and storing and will remain sufficiently stable during molding so that little offensive or harmful vapors will be given off.

Other objects will be apparent as the disclosure proceeds.

The process of making these resinous products consists in chemically reacting certain olefinic hydrocarbons, or other olefinic organic compounds, with sulfur dioxide at moderate temperatures whereby resinous reaction products of high molecular weight are formed.

The methods and conditions for producing these resinous products have been set forth in copending applications, Serial Nos. 599,350, filed March 16, 1932, and 628,449, filed August 11, 1932, now Patent No. 2,045,592.

After the resin has been formed a more or less complete removal of unreacted material may then be effected by distillation or equivalent means, but appreciable amounts of sulfur dioxide, other reactants or by-products remain occluded in the resinous product. In the solid form the resin may be granulated but, owing to the occluded impurities, cannot in many cases be satisfactorily molded under heat and pressure without the release of gases or vapors from the resin taking place, whereupon disrupting of the article being molded may result and the surfaces of the mold be attacked by the gases so released. When even small amounts of such impurities are present the molding of transparent or translucent articles may offer difficulty due to the release of sulfur dioxide or other impurities and gas bubbles or opaque areas remain in the molded article, which are obviously undesirable. For the removal of such impurities and improving the molding properties of olefin-sulfur dioxide resins we have invented new and useful processes as follows:

The crude resin resulting from the reaction of olefins and sulfur dioxide may be brought into contact with an organic solvent exerting no more than a limited solvent effect on the resin but capable of extracting sulfur dioxide, olefins, hydrocarbon polymers, and other reaction by-products. The extracting liquid is then separated mechanically from the resin and the small amount of liquid adhering to the resin is removed by evaporation. Many solvents may be used since it is a peculiarity of these resins that only a limited number of solvents exert a strong solvent effect upon the resins. The impurities on the other hand are soluble in most organic solvents. Consequently the suitability of any particular organic solvent can be ascertained by a simple test. Alcohols, ketones, ethers, esters, organic chlorides may be used, and many others provided the volatility is sufficiently high to allow of evaporation of virtually the last traces of solvent from the resin at temperatures no higher than 150 to 200° C. within which range decomposition of resin will usually begin. We have found methyl alcohol, ethyl alcohol, isopropyl alcohol, benzene, and acetone particularly suitable. In practicing the process, usually the crude resin in granular or powdered form is agitated with a quantity of solvent. The solvent dissolves the impurities and is then separated from the resin by filtration or the equivalent, and the resin is finally dried by heating in an oven, in vacuo, or in a stream of gas. The extraction step is conveniently conducted at ordinary temperatures but may be carried out at somewhat elevated temperatures if desired, but obviously below temperatures at which marked solution or decomposition of resin are apparent. Solvents which soften and swell the resin without dissolving it may be used for the extraction of impurities and a fine state of subdivision of the resin in such cases can usually be dispensed with.

The removal of volatile impurities from the crude resin may also be accomplished by heat, preferably in a stream of carrying gas or vapor, such as air, steam, or fuel gas which serves to sweep away volatilized impurities. Any carrying gas or vapor which is substantially free from constituents which react chemically with the resin or which are strongly adsorbed by it may be used. The higher the temperature the more rapid is the purification; the temperature obviously should not exceed that at which decomposition of the resin itself begins. The application of pressures below atmospheric in the removal of impurities in this way facilitates the purification, and we have found heating of the impure resin in vacuo at 50–250° C. to effect a purification sufficient for many purposes. The purified resin is thus obtained at an elevated temperature, and pressure can be most conveniently applied for molding in some cases without intermediate cooling.

The duration of heating required to effect removal of volatile impurities is obviously dependent on the characteristics of the resin, the fineness of granulation and the temperature. Usually a period of heating of two to ten hours is sufficient with a temperature of 100° C. when the resin is granulated to an average particle size of one sixtieth of an inch, and the time period required when heating in vacuo is of the same order as that required when a stream or gas is passed over the resin. High temperatures and finer subdivision shorten the time required, while lower temperatures increase the time. In some cases a finely divided resin may be purified by standing at room temperature or a little above for a period of several days or more with free access of air or gas.

Although in most cases it is found preferable to treat the resin in a finely divided form by a moderate heating in vacuum or in a stream of inert carrying gas, it is sometimes desirable to heat the resin to a temperature sufficiently high to make the resin more or less plastic, and mix or knead the resin during the heating with some sort of mechanical mixing machine. A mixer of the Banbury type provided with steam heating chambers and having an enclosed mixing chamber which can be connected to a vacuum pump has been found suitable for such treatment. In some cases, a heat treatment by this method of sufficient duration and intensity to decompose a part of the resin may be found beneficial in raising the softening temperature of the resin.

We have also found that the duration or intensity of heating required to effect such purification and produce a resin of satisfactory molding properties may be considerably reduced if the resin in granular form is merely moistened with methyl or ethyl alcohols or acetone, the heating operation being applied subsequently in vacuo or in the presence of gases as described. The reason for the improvement is not certain, but it is not unlikely that adsorbed impurities are dislodged from the internal surfaces of the granules, and the evaporation of the impurities is facilitated by the presence of solvent undergoing evaporation. Although the reason is not known with certainty, nevertheless, when tensile strength of resins treated by the various methods are compared, it is found that treatment comprising moistening the resin with an organic liquid, such as methyl alcohol, ethyl alcohol, or acetone, followed by heating to evaporate the organic liquid, effects a noticeably greater improvement than does the treatment comprising heating in vacuo or in a stream of inert gases.

Involatile impurities are not removed by such methods and for their removal, extraction by a solvent as previously described is effective.

An example of the first method stated above is as follows: A quantity of the dry pulverized resin is placed in a container suitable for tumbling or stirring the contents such as a ball mill or barrel mixer. Methyl alcohol is added until a thick slurry is obtained, the exact amount being immaterial. The mill is started and mixing continued for one to two hours after which the slurry is thrown on a filter and the liquid filtered off. The resin is removed from the filter and slowly dried in a well ventilated oven, after which it is ready for molding. The alcohol may be recovered by distillation.

A specific example of the second method is: A long cylindrical bomb built of stainless steel to withstand 100 pounds per square inch vapor pressure is filled with the dry, pulverized resin packed loosely enough to permit rapid flow of vapors thru it; saturated steam at 80 pounds pressure is passed thru the resin for a period of four to six hours; after the bomb has cooled the resin is removed in a condition suitable for molding.

A specific example of the third method is: The dry, finely-ground resin is heated in a mixer fitted with steam coils or electric heating elements; heating at a temperature about 30° C. below the softening point of the resin is continued with stirring for 30 minutes; the resin is then removed and is ready for use. On account of the high temperature necessary to remove $SO_2$ effectively by this treatment the resin is slightly darkened in color, therefore one of the first two methods is to be preferred except in cases where transparency is not of paramount importance.

An example of the fourth method is: The finely ground resin is mixed with a sufficient quantity of an organic liquid such as methyl alcohol to wet thoroughly the resin, whereby sulfur dioxide and volatile hydrocarbons are rapidly liberated from the resin as gases; the wet resin is then spread out and dried by careful heating in the atmosphere or in a stream of inert gas.

Having described our invention, what we claim is:

1. A process for improving the molding properties, appearance, and mechanical strength of the resinous products of the reaction of sulfur dioxide with olefinic organic bodies, which comprises bringing the said resinous product into contact with a liquid organic solvent thereby effecting an extraction of soluble bodies from the resinous product, then mechanically separating the liquid solvent from the resinous product, thereafter freeing said product from adhering solvent by evaporation.

2. The process as in claim 8 in which the solvent is selected from the group consisting of methyl alcohol, ethyl alcohol, isopropyl alcohol, benzene and acetone.

3. A process for improving the molding properties, and the appearance and mechanical strength of the molded resinous product of the reaction of sulfur dioxide with an olefinic organic compound, which comprises subjecting the crude resinous product to an elevated temperature below the temperature at which decomposition of the resin begins while passing in contact with said resinous product a stream of inert gas.

4. A process for improving the molding properties, appearance, and mechanical strength of the resinous product of the reaction of sulfur dioxide with olefinic bodies which comprises moistening the resin in the granular state with a solvent selected from the group consisting of methyl alcohol, ethyl alcohol, isopropyl alcohol, benzene, and acetone, then subjecting the moistened resin to evaporative conditions to effect removal of said solvent and volatile nonresinous bodies.

5. In the production of finished molded articles from crude resinous masses produced by the reaction of sulphur dioxide and olefinic organic compounds the step which comprises removing non-resinous impurities from said crude resinous masses by bringing said resinous masses into contact with a fluid in which non-resinous impurities are dispersed and said resinous masses are not dispersed at a temperature less than that at which substantial decomposition of the resinous mass takes place, and removing said fluid and non-resinous impurities dispersed therein.

6. In the production of finished molded articles from crude resinous masses produced by the reaction of sulphur dioxide and olefinic organic compounds the step which comprises removing non-resinous impurities from said crude resinous masses by bringing said resinous masses into contact with an inert gaseous fluid in which volatile non-resinous impurities are dispersed and said resinous masses are not dispersed at a temperature less than that at which substantial decomposition of the resinous masses takes place and removing said inert gaseous fluid and non-resinous impurities dispersed therein.

7. In the production of finished molded articles from crude resinous masses produced by the reaction of sulphur dioxide and olefinic organic compounds the step which comprises moistening a granulated crude resinous mass with a volatile organic liquid selected from the group consisting of methyl alcohol, ethyl alcohol, iso-propyl alcohol, benzene and acetone and subsequently removing by evaporation said organic liquid and non-resinous impurities at a temperature less than that at which substantial decomposition of the resinous mass takes place.

8. In the production of finished molded articles from crude resinous masses produced by the reaction of sulphur dioxide and olefinic organic compounds the step which comprises moistening a granulated crude resinous mass with a volatile organic liquid selected from the group consisting of methyl alcohol, ethyl alcohol, isopropyl alcohol, benzene and acetone and subsequently removing non-resinous impurities by bringing said moistened resinous masses into contact with an inert gaseous fluid in which volatile non-resinous impurities and said moistening liquid are dispersed and said resinous mass is not dispersed at a temperature less than that at which substantial decomposition of said resinous mass takes place and removing said inert gaseous fluid and material dispersed therein.

FREDERICK E. FREY.
PAUL A. BURY.

CERTIFICATE OF CORRECTION.

Patent No. 2,154,444.            April 18, 1939.

FREDERICK E. FREY, ET AL.

It is hereby certified that error appears in the printed specification of the above numbered patent requiring correction as follows: Page 2, second column, line 53, for the claim reference numeral "8" read --1--; and that the said Letters Patent should be read with this correction therein that the same may conform to the record of the case in the Patent Office.

Signed and sealed this 8th day of June, A. D. 1943.

Henry Van Arsdale,
Acting Commissioner of Patents.

(Seal)

5. In the production of finished molded articles from crude resinous masses produced by the reaction of sulphur dioxide and olefinic organic compounds the step which comprises removing non-resinous impurities from said crude resinous masses by bringing said resinous masses into contact with a fluid in which non-resinous impurities are dispersed and said resinous masses are not dispersed at a temperature less than that at which substantial decomposition of the resinous mass takes place, and removing said fluid and non-resinous impurities dispersed therein.

6. In the production of finished molded articles from crude resinous masses produced by the reaction of sulphur dioxide and olefinic organic compounds the step which comprises removing non-resinous impurities from said crude resinous masses by bringing said resinous masses into contact with an inert gaseous fluid in which volatile non-resinous impurities are dispersed and said resinous masses are not dispersed at a temperature less than that at which substantial decomposition of the resinous masses takes place and removing said inert gaseous fluid and non-resinous impurities dispersed therein.

7. In the production of finished molded articles from crude resinous masses produced by the reaction of sulphur dioxide and olefinic organic compounds the step which comprises moistening a granulated crude resinous mass with a volatile organic liquid selected from the group consisting of methyl alcohol, ethyl alcohol, iso-propyl alcohol, benzene and acetone and subsequently removing by evaporation said organic liquid and non-resinous impurities at a temperature less than that at which substantial decomposition of the resinous mass takes place.

8. In the production of finished molded articles from crude resinous masses produced by the reaction of sulphur dioxide and olefinic organic compounds the step which comprises moistening a granulated crude resinous mass with a volatile organic liquid selected from the group consisting of methyl alcohol, ethyl alcohol, isopropyl alcohol, benzene and acetone and subsequently removing non-resinous impurities by bringing said moistened resinous masses into contact with an inert gaseous fluid in which volatile non-resinous impurities and said moistening liquid are dispersed and said resinous mass is not dispersed at a temperature less than that at which substantial decomposition of said resinous mass takes place and removing said inert gaseous fluid and material dispersed therein.

FREDERICK E. FREY.
PAUL A. BURY.

CERTIFICATE OF CORRECTION.

Patent No. 2,154,444.     April 18, 1939.

FREDERICK E. FREY, ET AL.

It is hereby certified that error appears in the printed specification of the above numbered patent requiring correction as follows: Page 2, second column, line 53, for the claim reference numeral "8" read --1--; and that the said Letters Patent should be read with this correction therein that the same may conform to the record of the case in the Patent Office.

Signed and sealed this 8th day of June, A. D. 1943.

Henry Van Arsdale,
Acting Commissioner of Patents.

(Seal)